United States Patent [19]

Williams

[11] Patent Number: 5,734,506

[45] Date of Patent: Mar. 31, 1998

[54] HEAD UP DISPLAY PROJECTION SYSTEM HAVING A DOUBLE REFLECTING PRIMARY MIRROR

[75] Inventor: Robert D. Williams, Goleta, Calif.

[73] Assignee: Delco Electronics Corporation, Kokomo, Ind.

[21] Appl. No.: 699,587

[22] Filed: Aug. 19, 1996

[51] Int. Cl.$^6$ .................................................. G02B 27/14
[52] U.S. Cl. .......................................... 359/633; 359/630
[58] Field of Search .................................. 359/633, 630, 359/631, 1, 13, 15, 24, 634; 345/7, 8, 9

[56] References Cited

U.S. PATENT DOCUMENTS

| | | | |
|---|---|---|---|
| 4,937,139 | 6/1990 | Weinhrauch et al. | 350/345 |
| 5,249,081 | 9/1993 | Rogers | 359/633 |
| 5,506,728 | 4/1996 | Edwards et al. | 359/629 |
| 5,585,967 | 12/1996 | Monroe | 359/629 |
| 5,596,451 | 1/1997 | Handschy et al. | 359/633 |
| 5,606,458 | 2/1997 | Fergason | 359/630 |
| 5,610,765 | 3/1997 | Colucci | 359/633 |
| 5,619,284 | 4/1997 | Magocs | 348/757 |

OTHER PUBLICATIONS

Kingslake, Rudolf, Lens Design Fundamentals, Academic Press, Inc., 1978.

Primary Examiner—David C. Nelms
Assistant Examiner—Ricky Mack
Attorney, Agent, or Firm—Jimmy L. Funke

[57] ABSTRACT

Head up display apparatus comprises an image source for projecting an image that is to be displayed, a head up display projection unit, and a combiner for reflecting an image that is viewable. The image source projects an image that is to be displayed. The projection unit comprises a double-reflecting primary mirror that receives the image projected by the image source, and a secondary correcting mirror that receive the image reflected from the primary mirror. The secondary correcting mirror reflects the image back onto the primary mirror, and this image is reflected out of the projection unit to the combiner, which reflects the image that is displayed to a viewer. The dual-mirror, triple-reflection design of the present allows it to be smaller than equivalent designs that do not incorporate a mirror arrangement that provides for double-reflection of the projected image from the primary mirror. The projection unit essentially operates as a three-element design, but contains only two optical elements. The optical performance is better than any equivalent dual-mirror design that does not incorporate a double-reflection light path, and the physical package is more compact.

6 Claims, 2 Drawing Sheets

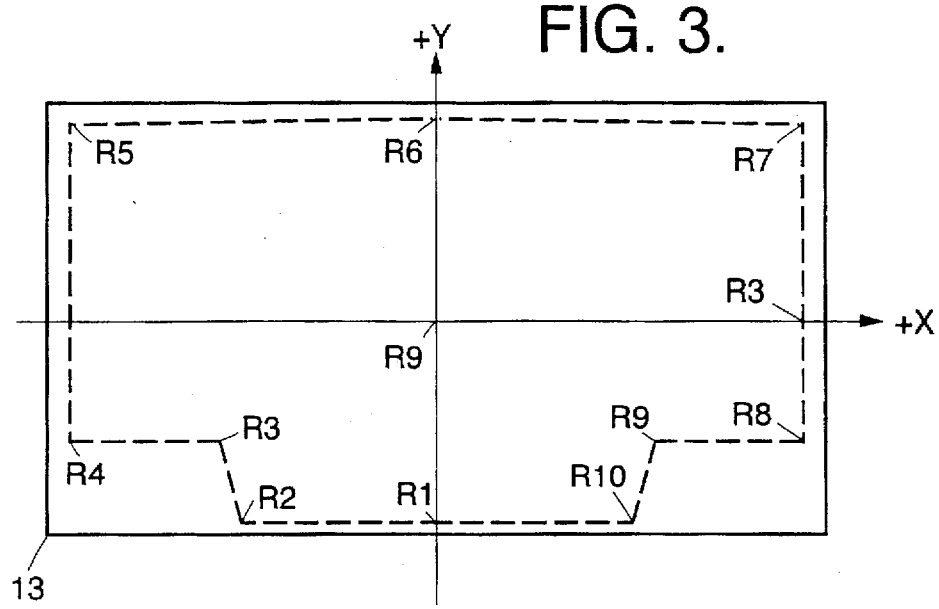
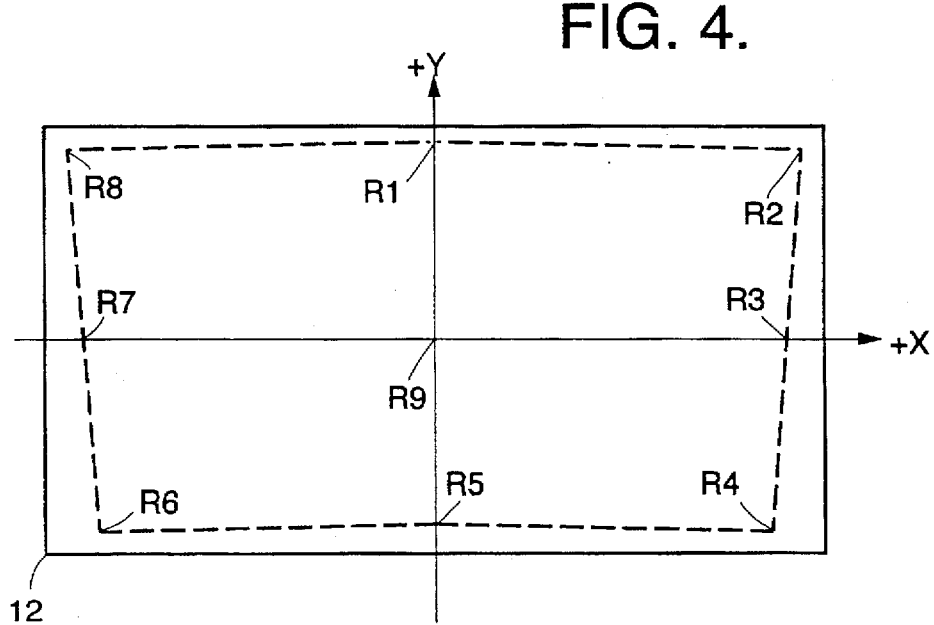

HEAD UP DISPLAY PROJECTION SYSTEM HAVING A DOUBLE REFLECTING PRIMARY MIRROR

BACKGROUND

The present invention relates generally to head up display projection systems, and more particularly, to a head up display projection system and projection unit employing a double-reflecting primary mirror.

Implementation of head up display projection units in vehicles has been hampered by the relatively large volumes required by projection units thereof. Thus, there is a need for a head up display projection system and unit that may be used in a vehicle where space restrictions prevent the use of conventional head up displays.

Prior art relating to the present invention is disclosed in U.S. Pat. No. 4,973,139 entitled "Automotive Head-Up Display" assigned to the assignee of the present invention. U.S. Pat. No. 4,973,139 discloses a projection unit that uses a single tiltable mirror having optical power to project an image, and one flat mirror to fold the optical path. Since the optical path is only folded twice inside the projection unit, the interior volume is not efficiently utilized.

The present invention also has some characteristics that are similar to an Offner catoptric system described in *Lens Design Fundamentals* published by Kingslake, 1978, at page 321, which is a symmetric, unit-magnification system used for autocollimation. In the Offner catoptric system, the optical path is reflected twice by the same mirror, but the two reflections occur on separate areas of the mirror.

Accordingly, it is an objective of the present invention to provide for a compact head up display projection unit for use in head up display projection systems. It is a further objective of the present invention to provide for a head up display projection unit that may be used in vehicle applications where space is limited.

SUMMARY OF THE INVENTION

To meet the above and other objectives, the present invention provides for a head up display projection system and projection unit employing a double-reflecting primary mirror. The projection system comprises an image source, the head up display projection unit, and an optical combiner. The image source is designed to project an image that is to be displayed, such as to an operator of a vehicle, for example. The projection unit comprises the double-reflecting primary mirror which is disposed to receive the image projected by the image source. A secondary correcting mirror is disposed to receive the image reflected from the double-reflecting primary mirror and then reflect the image back onto the double-reflecting primary mirror. The image that impinges upon the double-reflecting primary mirror is reflected out of the projection unit to the optical combiner, which reflects the image for viewing.

By folding the optical path over itself such that four different optical paths cross over each other, the volume inside the projection unit is efficiently utilized. The present design is asymmetric, has a magnification of about 14×, and the double reflection occurs on overlapping areas of the double-reflecting primary mirror. Because the double reflection is overlapping, the overall size of the head up display projection unit is smaller than conventional designs. The projection unit thus uses an arrangement of two mirrors that causes projected light to make three reflections to provide a large eyebox. This arrangement requires less spatial volume than previous projection units developed by the assignee of the present invention. This is very advantageous when the head up display projection unit is used in a vehicle, for example. The double reflection of the projected light off the primary mirror is the heart of this invention.

The dual-mirror, triple-reflection design of the present projection unit allows it to be smaller than equivalent designs that do not incorporate a mirror arrangement that provides for double-reflection of the projected image from the primary mirror. This is accomplished by using the space inside the projection unit for more than one optical path. The projection unit essentially operates as a three-element design, but contains only two optical elements. The optical performance is better than any equivalent dual-mirror design that does not incorporate a double-reflection light path, and the physical package is more compact. The present invention may be used in vehicles where existing space restrictions prevent the use of other systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates a primary mirror employed in the head up display projection unit of FIG. 1; and FIG. 4 illustrates a secondary correcting mirror employed in the head up display projection unit of FIG. 1.

DETAILED DESCRIPTION

Figure 1:
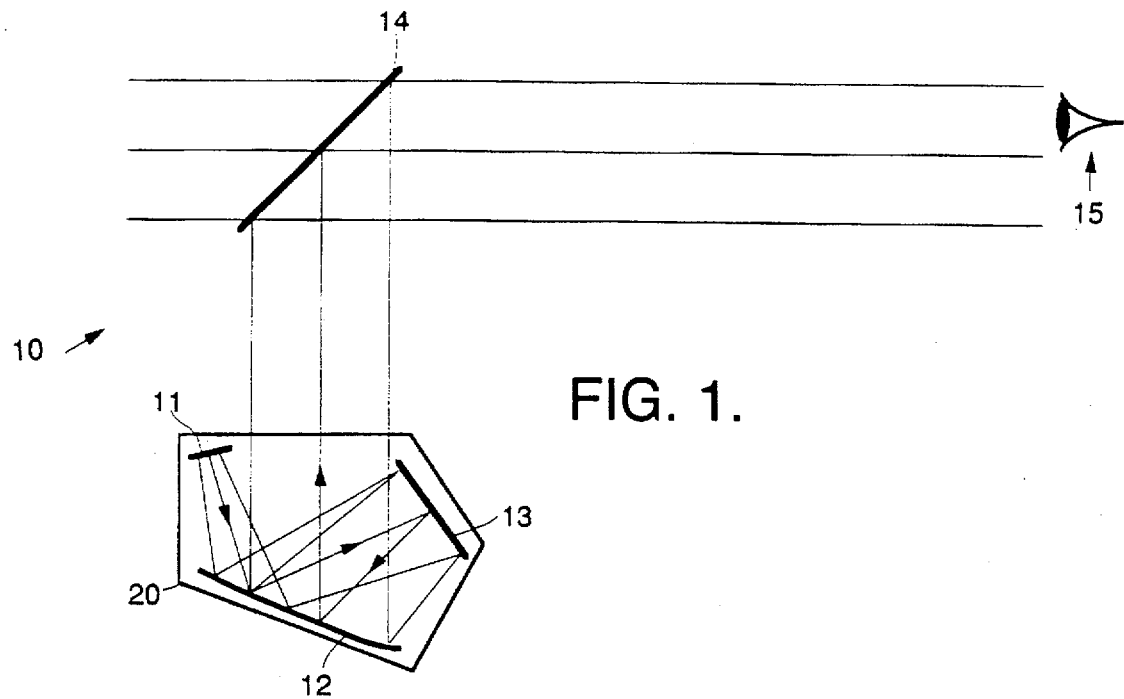
FIG. 1 is a side view of a head up display projection unit in accordance with the principles of the present invention.

Referring now to the drawing figures, FIG. 1 is a side view of a head up display projection system 10 comprising an improved head up display projection unit 20 in accordance with the principles of the present invention. The projection system 10 comprises an image source 11 for projecting an image that is to be displayed, the projection unit 20, and a combiner 14 for reflecting an image that is viewable. The image source 11 is designed to project an image that is to be displayed to a viewer 15, such as an operator 15 of a vehicle, for example.

The projection unit 20 comprises a double-reflecting primary mirror 12 that is disposed to receives the image projected by the image source 11. A secondary correcting mirror 13 is disposed to receive the image reflected from the primary mirror 12 and reflect the image back onto the primary mirror 12. The image that impinges upon the primary mirror 12 is reflected out of the projection unit 20 to the combiner 14, which reflects the image for display, such as into eyes of the viewer 15.

In operation, and as is illustrated in FIG. 1, light from the image source 11 impinges on the primary mirror 12 where it is reflected to the secondary correcting mirror 13 which then reflects the light back to the primary mirror 12. The light impinges upon the primary mirror 12 at such angle that it is reflected out of the projection unit 20 to the combiner 14, where it is reflected into the eyes of the viewer 15. The projection unit 20 thus presents a large eyebox for the viewer 15.

Optical aberrations that are introduced by reflections from the primary mirror 12 are negated by the secondary correcting mirror 13 such that the image viewed by the viewer 15 is clear and legible. In the design shown in FIG. 1, the primary mirror 12 is spherical and the secondary correcting mirror 13 is aspheric. However, it is to be understood that the primary mirror 12 may also be constructed using aspheric optics if higher performance is required.

Figure 2:
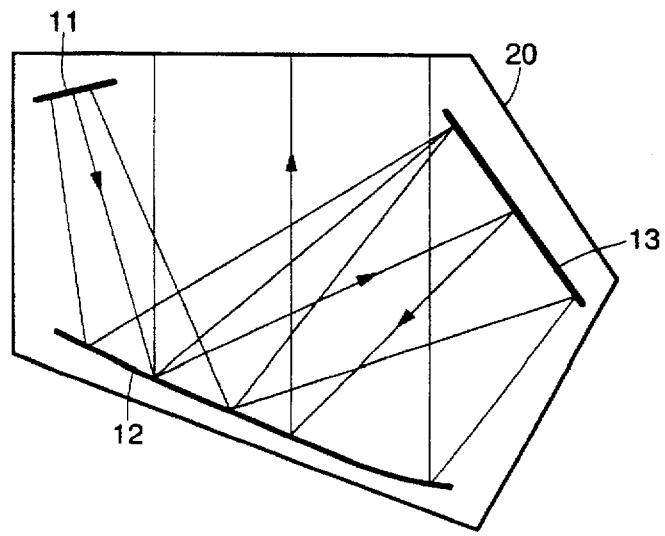
FIG. 2 illustrates the volume that is saved by using the present invention.

The area between the primary and secondary correcting mirrors 12, 13 is utilized by up to four different ray paths that decreases the overall volume of the projection unit 20. FIG. 2 shows the space that is used by more than one ray path (stippled area), making the present head up display projection unit 20 at least twice as space efficient as previous designs by the assignee of the present invention.

The optical parameters of a preferred embodiment of the projection unit 20 described herein are as follows. The field of view is 2° vertical by 6° horizontal, the instantaneous eyebox size is 100 mm vertical by 200 mm horizontal, the eyebox size is 500 mm vertical by 200 mm horizontal, the image distance is 6096 mm, and the magnification is 14.3×.

FIGS. 3 and 4 illustrate the primary and secondary correcting mirrors 12, 13 used in the projection unit 20. Tables of sample points (R1–R10 and R1–R9) defining clear apertures of the primary and secondary correcting mirrors 12, 13 are presented in Tables 1 and 2, respectively. Table 3 gives spacing and tilt information to allow construction of the projection unit 20.

The optical description for the primary mirror 12, which in the preferred embodiment is spherical, is given by the equation:

$$Z = R - (R^2 - X^2 - Y^2)^{1/2},$$

where R=2000±12. The mirror parameters are given in Table 1.

TABLE 1

| Ray | Y (mm) | X (mm) | Z (mm) |
|---|---|---|---|
| 1 | −108.0751 | 0.0000 | 2.9222 |
| 2 | −107.7382 | −65.5604 | 3.9804 |
| 3 | −65.2578 | −75.0290 | 2.4735 |
| 4 | −65.8854 | −140.4801 | 6.0280 |
| 5 | 60.7258 | −141.4354 | 5.9317 |
| 6 | 64.0698 | 0.0000 | 1.0265 |
| 7 | 60.7258 | 141.4354 | 5.9317 |
| 8 | −65.8854 | 140.4801 | 6.0280 |
| 9 | −65.2578 | 75.0290 | 2.4735 |
| 10 | −107.7382 | 65.5604 | 3.9804 |

The optical description for the secondary correcting mirror 13 is given by the equation:

$$Z = R - \sqrt{R^2 - X^2 - Y^2} + C_5(X^2 - Y^2) + C_8 Y(X^2 + Y^2) + C_{10} Y(3X^2 - Y^2) + C_{11}(X^2 + Y^2) + C_{12}(X^4 - Y^4),$$

where, R=2000±12, $C_5$=+0.51187133 E-04, $C_8$=−0.20814148 E-06, $C_{10}$=+0.31732219 E-09, $C_{11}$=−0.52477933 E-09, and $C_{12}$=+0.21524250 E-09. The surfaces identified in Table 3 correspond to the surfaces identified in FIG. 2.

TABLE 2

| Ray | Y (mm) | X (mm) | Z (mm) |
|---|---|---|---|
| 1 | 54.0332 | 0.0000 | 0.9429 |
| 2 | 51.2824 | 132.3856 | 8.2318 |
| 3 | −2.5132 | 129.0292 | 7.2430 |
| 4 | −52.8329 | 125.8739 | 7.9822 |
| 5 | −50.9850 | 0.0000 | 0.8970 |
| 6 | −52.8329 | −125.8739 | 7.9822 |
| 7 | −2.5132 | −129.0292 | 7.2430 |
| 8 | 51.2824 | −132.3856 | 8.2318 |
| 9 | 0.0000 | 0.0000 | 0.0000 |

TABLE 3

| Surface | Radius | Thickness | Medium | Decenter | Tilt |
|---|---|---|---|---|---|
| 0 | 0. | −6096. | AIR | | |
| 1 | 0. | 0. | AIR | | |
| 2 | 0. | 6096. | AIR | | |
| 3 | 0. | −6096. | AIR | | |
| 4 | 0. | 0. | AIR | | |
| 5 | 0. | 0. | AIR | | |
| 6 | 0. | 0. | AIR | | |
| 7 | 0. | 0. | AIR | | |
| 8 | 0. | 608.0 | AIR | | |
| 9 | 0. | 0. | AIR | | |
| 10 | 0. | 0. | Mirror tilt | 0.000 | 45.000° |
| 11 | 0. | 0. | AIR reverse tilt | 0.000 | −45.000° |
| 12 | 0. | −400.0 | AIR | | |
| 13 | 2000. | 0. | Mirror tilt | 0.000 | 22.500° |
| 14 | 0. | 0. | AIR reverse tilt | 0.000 | 22.500° |
| 15 | 0. | 145.0 | AIR | | |
| 16 | −1290.64 | 0. | Mirror tilt | 0.000 | 11.000° |
| 17 | 0. | 0. | AIR reverse tilt | 0.000 | −11.000° |
| 18 | 0. | −134.4 | AIR | | |
| 19 | 2000. | 0. | Mirror tilt | 54.318 | −44.500° |
| 20 | 0. | 0. | AIR reverse tilt | 54.318 | 44.500° |
| 21 | 0. | 180.0 | AIR | | |
| 22 | 0. | 1.17 | BK7 tilt | 14.564 | −9.744° |
| 23 | 0. | 0 | AIR | | |
| 24 | 0. | | | | |

The above surfaces correspond to surfaces used in a Hexagon optical design program employed at the assignee of the present invention that is used to design the projection unit 20.

Thus, a head up display projection system and projection unit employing a double-reflecting primary mirror has been disclosed. It is to be understood that the described embodiment is merely illustrative of some of the many specific embodiments which represent applications of the principles of the present invention. Clearly, numerous and varied other arrangements can be readily devised by those skilled in the art without departing from the scope of the invention.

What is claimed is:

1. A head up display projection system comprising:
   an image source for projecting an image that is to be displayed to a viewer;
   a head up display projection unit comprising:
      a double-reflecting primary mirror having a reflecting surface disposed to receive the image projected by the image source; and
      a secondary correcting mirror disposed to receive the image reflected from the reflecting surface of the primary mirror and to reflect the image back onto the reflecting surface of the primary mirror in substantial overlap with the image projected onto said reflecting surface by said image source, and wherein the image that is reflected back onto the reflecting surface of the primary mirror from said secondary correcting mirror is reflected out of the projection unit; and a combiner for receiving the image reflected out of the projection unit and for reflecting such received image to said viewer.

2. The system of claim 1 wherein the primary mirror is spherical and the secondary correcting mirror is aspheric.

3. The system of claim 1 wherein the primary mirror is aspheric and the secondary correcting mirror is aspheric.

4. A head up display projection unit for use with a head up display projection system comprising an image source for projecting an image that is to be displayed to a viewer and a combiner for receiving a magnified image from the projection unit and for displaying the magnified image to said viewer, said head up display projection unit comprising:

a double-reflecting primary mirror having a reflecting surface disposed to receive the image projected by the image source; and a secondary correcting mirror disposed to receive the image reflected from the reflecting surface of the primary mirror and to reflect the image back onto the reflecting surface of the primary mirror in substantial overlap with the image projected onto said reflecting surface by said image source, and wherein the image that is reflected back onto the reflecting surface of the primary mirror from said secondary correcting mirror is reflected out of the projection unit for receipt by said combiner.

5. The projection unit of claim 4 wherein the primary mirror is spherical and the secondary correcting mirror is aspheric.

6. The projection unit of claim 4 wherein the primary mirror is aspheric and the secondary correcting mirror is aspheric.

* * * * *